Patented Aug. 18, 1925.

1,549,885

UNITED STATES PATENT OFFICE.

EDWIN R. LITTMANN, OF TERRE HAUTE, INDIANA, ASSIGNOR TO COMMERCIAL SOLVENTS CORPORATION, OF TERRE HAUTE, INDIANA, A CORPORATION OF MARYLAND.

PRODUCTION OF 3-NITROPHTHALIC ACID.

No Drawing.    Application filed April 1, 1925. Serial No. 19,975.

*To all whom it may concern:*

Be it known that I, EDWIN R. LITTMANN, a citizen of the United States, residing at Terre Haute, in the county of Vigo and State of Indiana, have invented certain new and useful Improvements in the Production of 3-Nitrophthalic Acid, of which the following is a specification.

My invention relates to the production of 3-nitrophthalic acid, this compound being a substance of importance in the chemical industry as an organic acid and as an intermediate material for the production of other substances.

One method for the production of 3-nitrophthalic acid which has been employed in the past consists in nitrating naphthalene, purifying the nitronaphthalene and oxidizing the nitronaphthalene with suitable reagents to form 3-nitrophthalic acid. This is a long and tedious method, involving several reactions. The yields are not good, and difficulty is experienced in securing 3-nitrophthalic acid by this method.

Another, and better, method for the production of 3-nitrophthalic acid is that described by Miller (Annalen der Chemie, volume 208, page 233) which consists in nitrating phthalic acid with fuming nitric acid in the presence of sulfuric acid. Kenner and Mathews (Journal of the Chemical Society, volume 105, page 2476) applied this same process to the nitration of phthalic anhydride. The method of Miller, supra, presents disadvantages for commercial operation. It is difficult to employ fuming nitric acid on a large scale and it is difficult to secure pure products in good yield for the reason that the extreme reactivity of the fuming nitric acid causes the nitration to proceed too far, with the consequent production of by-products of higher nitration and the resultant contamination of the 3-nitrophthalic acid.

The object of my invention is to provide an improved process for the production of 3-nitrophthalic acid in which a high yield of 3-nitrophthalic acid is obtained and no loss due to higher nitration products is incurred. A further object of my invention is to provide a simple method of manufacturing 3-nitrophthalic acid in which the use of fuming nitric acid is unnecessary.

I have discovered that phthalic anhydride when treated with proper proportions of ordinary concentrated sulfuric and nitric acid, may be reacted to form substantially pure 3-nitrophthalic acid in good yield and that by a novel method of purification, pure 3-nitrophthalic acid may be obtained.

For example, 185 pounds (1¼ molar weights) of phthalic anhydride is placed in a suitable reaction kettle, and 248 pounds (3 molar weights) of concentrated nitric acid (specific gravity 1.42) is added, the mass being agitated. 322 pounds (3 molar weights) of sulfuric acid (specific gravity 1.84) is then slowly added, the reaction mass being agitated during the addition.

The mixture in the kettle is maintained at a temperature of about 95° C. until the reaction is complete, usually from two to three hours. The mixture in the reaction kettle is then cooled to about 50–60° C. and is slowly run into a tank containing 500 pounds of water. The water is vigorously agitated during the addition of the reaction mixture and this agitation serves to break up the lumps of 3-nitrophthalic acid which precipitate, and to remove the adherent sulfuric and nitric acids.

After the mixing and washing operation is complete, the 3-nitrophthalic acid is removed from the water by centrifuging or filtration. The acid obtained in this manner is substantially pure 3-nitrophthalic acid. Traces of water and nitric acid may be removed by agitating the acid with 600 pounds of benzol and then removing half of the benzol by ordinary distillation. The residual traces of water are removed in a constant boiling mixture with benzol vapor, and any residual nitric acid is converted to nitrobenzol which is removed during distillation.

After about half the benzol is removed by distillation, the remainder may be removed by filtration or by vacuum distillation, whereupon a pure 3-nitrophthalic acid results. The yield of material is from 85–90% based on phthalic anhydride. This material is a crystalline yellow solid melting at 198° C. and having a neutral equivalent of 209.

While I have described the production of 3-nitrophthalic acid from phthalic anhydride, it should be understood that phthalic acid may be alternatively employed.

While I have specified definite proportions of the concentrated acid reagents it should be understood that these proportions may be varied without departing from my invention and application which discloses a new and novel method for the production of pure 3-nitrophthalic acid by the reaction of phthalic anhydride or phthalic acid with ordinary concentrated sulfuric and nitric acids.

Now having fully described my invention, I claim the following as new and novel:—

1. A process for the production of 3-nitrophthalic acid which consists in reacting one molar weight of phthalic anhydride with a mixture comprising substantially three molar weights each of concentrated nitric and sulfuric acid, and pouring the reaction product into water.

2. A process for the production of 3-nitrophthalic acid which consists in reacting 185 parts of phthalic anhydride with a mixture of 248 parts of concentrated nitric acid and 322 parts of concentrated sulfuric acid, and pouring the reaction product into water.

3. A process for the production of 3-nitrophthalic acid which consists in mixing 185 parts of phthalic anhydride with 248 parts of concentrated nitric acid, adding 322 parts of concentrated sulfuric acid thereto, and pouring the reaction product into water.

4. A process for the production of 3-nitrophthalic acid which consists in mixing 185 parts of phthalic anhydride with 248 parts of concentrated nitric acid, adding 322 parts of concentrated sulfuric acid thereto with agitation, and pouring the reaction mixture into water.

5. A process for the production of 3-nitrophthalic acid which consists in mixing 185 parts of phthalic anhydride with 248 parts of concentrated nitric acid, adding 322 parts of concentrated sulfuric acid thereto with agitation, maintaining the mass at about 95° C. until the reaction is complete, agitating the mass with water, and removing the precipitated 3-nitrophthalic acid.

6. In a process for the production of 3-nitrophthalic acid, the step which consists in removing traces of water and nitric acid from the 3-nitrophthalic acid by adding benzol thereto, and distilling off a portion of the benzol to remove traces of water and nitric acid from the 3-nitrophthalic acid.

In testimony whereof I affix my signature.

EDWIN R. LITTMANN.